United States Patent
Ball

[11] Patent Number: 5,890,312
[45] Date of Patent: Apr. 6, 1999

[54] FISHING APPARATUS

[76] Inventor: Timothy T. Ball, 1952 Circle Dr., Fairgrove, Mich. 48733

[21] Appl. No.: 802,974

[22] Filed: Feb. 20, 1997

[51] Int. Cl.$^6$ .................................................. A01K 97/12
[52] U.S. Cl. ...................................................... 43/16; 43/15
[58] Field of Search ............................................ 43/15, 16

[56] References Cited

U.S. PATENT DOCUMENTS

| | | | |
|---|---|---|---|
| 1,996,704 | 4/1935 | Hawkinson | 43/16 |
| 3,017,715 | 1/1962 | Kennedy | 43/16 |
| 3,571,963 | 3/1971 | Ledbetter | 43/16 |
| 3,874,105 | 4/1975 | Andree et al. | 43/15 |
| 4,146,988 | 4/1979 | Bednarczyk | 43/17 |
| 4,235,035 | 11/1980 | Guthrie | 43/15 |
| 4,285,154 | 8/1981 | Grahl | 43/17 |
| 4,310,983 | 1/1982 | Irvin et al. | 43/17 |
| 4,887,777 | 12/1989 | Rasmussen | 242/106 |
| 5,050,332 | 9/1991 | Cross | 43/15 |
| 5,050,333 | 9/1991 | Debreczeni | 43/15 |
| 5,067,269 | 11/1991 | Eppley et al. | 43/17 |
| 5,107,614 | 4/1992 | Gonnello | 43/17 |
| 5,163,243 | 11/1992 | Wold, Jr. et al. | 43/17 |
| 5,245,778 | 9/1993 | Gallegos et al. | 43/15 |
| 5,448,850 | 9/1995 | Gonnello | 43/17 |
| 5,524,376 | 6/1996 | Flisak | 43/15 |
| 5,542,205 | 8/1996 | Updike | 43/15 |
| 5,570,534 | 11/1996 | Ford | 43/15 |

*Primary Examiner*—Kurt Rowan
*Attorney, Agent, or Firm*—John J. Swartz

[57] ABSTRACT

Fishing apparatus for setting a fish hook into a fish striking the hook and concurrently signaling the strike. The fishing apparatus includes mechanism for swingably mounting a fishing pole having a fishing reel thereon around which is wound a fishing line having a terminal end mounting a fish hook. A signaling flag is mounted on a flexible staff for movement between a stowed position and a signaling position. Mechanism is provided for moving the rod in the direction away from the base in response to tension force being applied to the fishing line to set the hook. The fish strike signaling flag is released in response to tension force being applied to the fishing line.

1 Claim, 4 Drawing Sheets

FISHING APPARATUS

BACKGROUND OF THE INVENTION

1. Field of the Invention

This invention relates to fishing apparatus and more particularly, to apparatus which will automatically set a fish hook in response to a fish striking the fishing hook and concurrently signal a fish being caught.

2. Description of the Prior Art and Objects

Fishermen have heretofore utilized a variety of tip up devices for catching fish while the fishing apparatus is unattended and signaling a fish being caught. Such devices are illustrated, for example, in U.S. Pat. No. 5,163,243, issued to George R. Wold, Jr., on Nov. 17, 1992; U.S. Pat. No. 4,285,154 issued to Paul F. Grahl, on Aug. 25, 1981; U.S. Pat. No. 5,448,850, issued to Lawrence J. Gonnello, on Sept. 12, 1995; and U.S. Pat. No. 5,067,269 issued to David M. Eppley on Nov. 26, 1991.

Sometimes, a fish will strike the bait with sufficient force to trigger the tip up but without sufficient force to impale itself on the hook. The game fish will sometimes "mouth the bait" and/or carry the bait without striking the bait with sufficient force to impale itself upon the fishing hook. If, in such instance, a fisherman was manually holding the fishing pole at the time of the strike, the fisherman would suddenly jerk the pole and line in a direction away from the fish, thereby causing the hook to penetrate and hook the fish.

With the unattended tip up apparatus utilized heretofore, there is no device for setting the hook. Accordingly, it is an object of the present invention to provide tip up fishing apparatus including mechanism for setting a fish hook.

It is another object of the present invention to provide mechanism for setting the hook on an unattended fishing pole and for signaling a setting of the hook as the hook is being set.

It is another object of the present invention to provide fishing apparatus which is responsive to tension force being applied to a hook mounting fishing line for causing the fishing pole and line thereon to suddenly jerk to set the hook.

It is another object of the present invention to also provide mechanism for pivotally mounting a fishing pole and mechanism for swinging the pole in response to tension force being applied to a fishing line.

It is still another object of the present invention to provide fishing apparatus of the type described including a swingably mounted fishing pole holding mechanism and mechanism for moving the pole holding mechanism to set a hook when a fish strikes a fishing line supported by the fishing pole.

It is a further object of the present invention is to provide fishing apparatus of the type described including signaling mechanism operable in response to movement of the pole moving mechanism, to signal a fish being caught.

It is another object of the present invention to provide fish hook setting mechanism of the type described which is responsive to a fish hook mounting line being payed out in one direction for moving the suddenly bodily moving the line in an opposite direction to set the hook mounted on the line.

Another object of the present invention is to provide apparatus of the type described including signaling mechanism responsive to tension force being applied to the fish line by a fish strike to signal the strike.

It is another object of the present invention to provide fishing apparatus of the type described including a flexible signal member having a free terminal flag end and trigger mechanism for receiving the fishing line and detachably holding the terminal flag end but releasing the terminal flag end in response to tension force being applied to the line when a fish strikes the line.

Other objects and advantages of the present invention will become apparent to those of ordinary skill in the art as the description thereof proceeds.

SUMMARY OF THE INVENTION

Fishing apparatus comprising a base: fishing line holding mechanism for holding a fishing line; and mechanism on the base responsive to tension force being applied to the fishing line in one direction for suddenly bodily moving the line in opposite direction.

DESCRIPTION OF THE DRAWINGS

The invention may be more readily understood by referring to the accompanying drawings, in which.

DESCRIPTION OF PREFERRED EMBODIMENT

Figure 1:
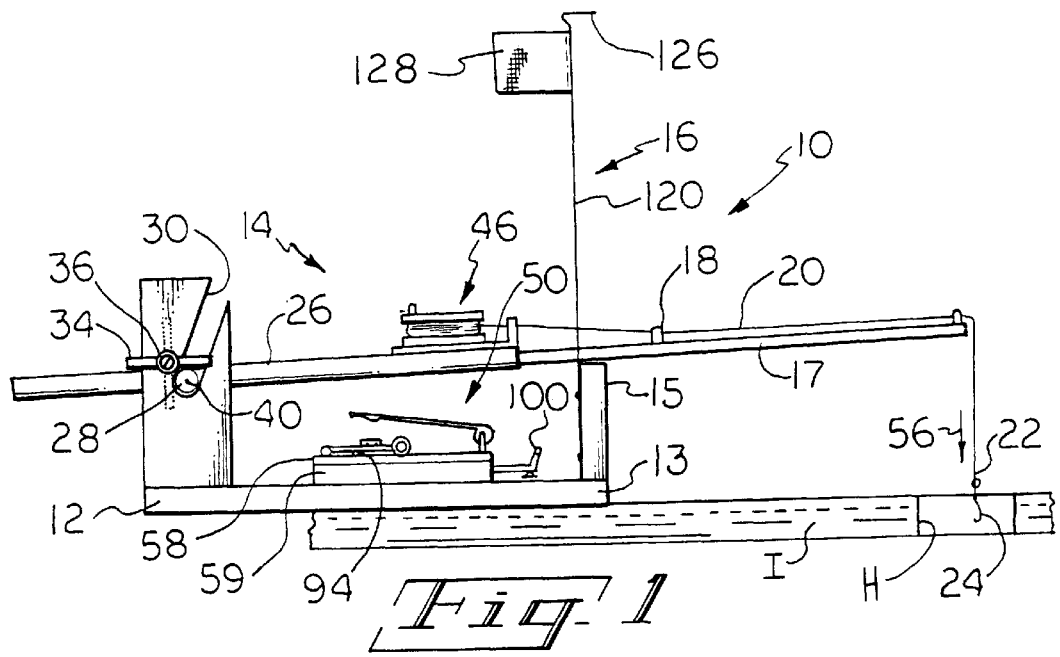
FIG. 1 is a side elevational view of apparatus constructed according to the present invention, with a tip up signaling flag being illustrated in a signaling position and a pole moving member in a rest position.

Fishing apparatus constructed according to the present invention, generally designated 10, includes a base, generally designated 12, mounting a fishing pole, generally designated 14, and a signaling flag, generally designated 16. The base member 12 includes a flat platform 13 mounting a forwardly disposed rod rest 15 on which the fishing pole 14 rests.

Figure 3:
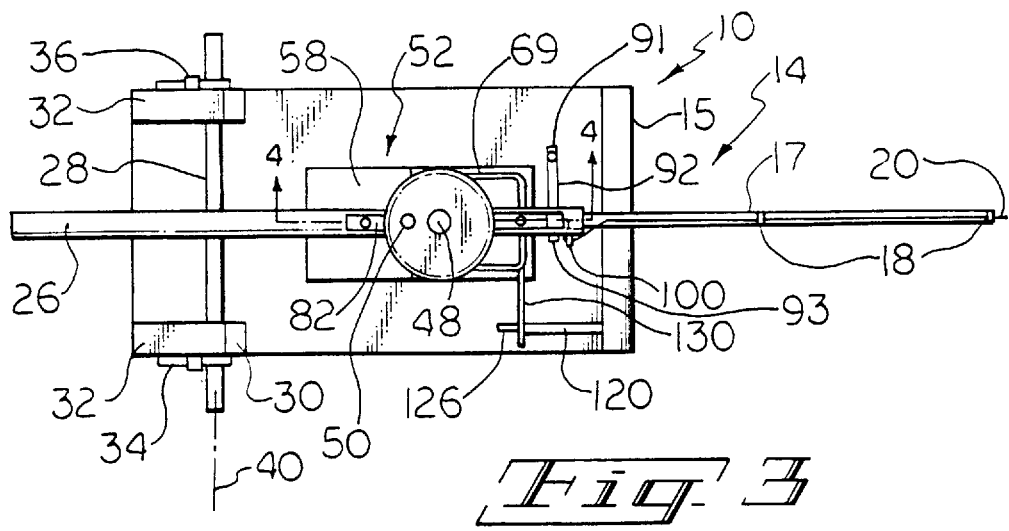
FIG. 3 is a top plan view of the apparatus illustrated in FIG. 2.

The fishing pole 14 includes a staff 17 having a plurality of longitudinally spaced apart eyelets 18 receiving a fishing line, generally designated 20, having a terminal end 22 coupled to a fishing hook 24, as usual. The fishing rod staff 17 is mounted on a rod mounting handle 26 fixed to a transverse pole mounting pivot member 28 which is rotatably received by a pair of rearwardly, downwardly inclined slots 30 provided in a pair of laterally spaced apart, upstanding brackets 32. A turn button, generally designated 34, is pivotally mounted on each of the brackets 32 via a screw 36 for movement between a keeping position, illustrated in solid lines in FIGS. 1 and 3, and a rod releasing position, illustrated in chain lines in FIG. 1, to permit the pole mounting shaft 28 to be bodily removed from the slots 30. The pivotal rod mounting shaft 28 has a transverse axis 40 about which the shaft 28 can rotate.

A fishing reel of conventional construction, generally designated 46, is rotatably mounted on the handle 26 via an upstanding spindle 48 and includes a handle 50 for manually rotating the reel 46 about the axis of shaft 48 to wind and unwind the fishing line 20 thereon.

Apparatus, generally designated 52, is provided for setting the hook 24 when a fish tugs on the hook 24 and moves the line outwardly and downwardly in the direction of the arrow 56. The hook setting mechanism 52 includes a raised plate 58 mounted in spaced relation with the base platform 13 via a pair of laterally spaced apart upstanding supports 59.

The hook setting mechanism 52 includes pole moving apparatus, generally designated 60, which basically comprises a typical mouse trap construction having a metal spring, generally designated 64, provided with a coiled section 66 and a hollow, U-shaped band 68. The U-shaped band 68 includes a pair of parallel legs 69 having outer ends spanned by a pole moving bar 70. The spring 64 is swingably mounted on the platform 58 via a pair of U-shaped clips 72 which allow the pole moving apparatus 60 to swing from a set position, illustrated in FIGS. 2–5, to the intermediate position illustrated in FIG. 6, and then to the released position illustrated in FIG. 1.

The spring member 64 is held in the set position illustrated in FIGS. 2–5 via a keeper, generally designated 74, which is swingably mounted on a U-shaped staple 76, or the like, mounted in the upper face of elevated plate 58. The keeper 74 has an offset end 78 which is detachably received by a lateral projection or retaining clip 80 provided on a pivotal holder plate, generally designated 82. The holder plate 82 is swingably mounted on the elevated plate 58 via a U-shaped mount member 84. The holder plate 82 is swung upwardly about the pivot 84 to receive the offset portion 78 of the keeper 74 in a fashion conventional to a conventional mouse trap construction.

Apparatus for triggering the release of the keeper bar 74 and the spring 64 comprises a trigger member, generally designated 86, including a trigger rod, generally designated 88, having an elbow 90 pivotally mounted on the base 58 and swingably received under one free end 93 of a yieldable spring blade 92 having an opposite end 93 fixed to the elevated plate 58. The trigger rod 88 is disposed between the laterally spaced, upstanding plate supports 59 and beneath the elevated plate 58 and includes an upstanding leg 94 extending through an aperture 95 provided in elevated plate 58. The upstanding leg 94 has a terminal end 96 coupled to the holder plate 82. The opposite end of bar 88 includes an upstanding leg 98 having a laterally offset, fish line receiving, terminal end 100 which, in the position illustrated in FIGS. 2–5, receives a portion 102 of the fishing line 20.

The rod moving and flag holding spring 64 is initially set by swinging it from the rest position, illustrated in FIG. 1, to the set position, illustrated in FIGS. 2–5, whereby the coiled spring 66, tending to keep the pole moving member 64 in the rest position, illustrated in FIG. 1, is tensioned. The pole moving member 64 is held in the set position, illustrated in FIGS. 2–5, by the keeper bar 74 which is swung upwardly over the pole moving member 64. The terminal offset end 78 of the keeper 74 is disposed below the retaining clip 80 provided on holder plate 82.

Figure 2:
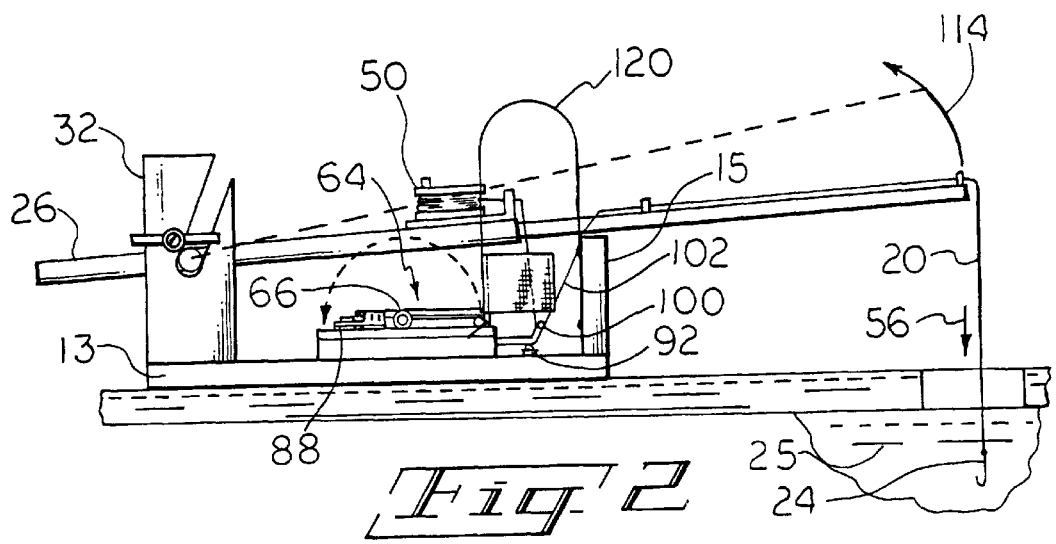
FIG. 2 is a similar side elevational view illustrating the signaling flag and the pole moving member in an adjusted, set position.
Figure 4:
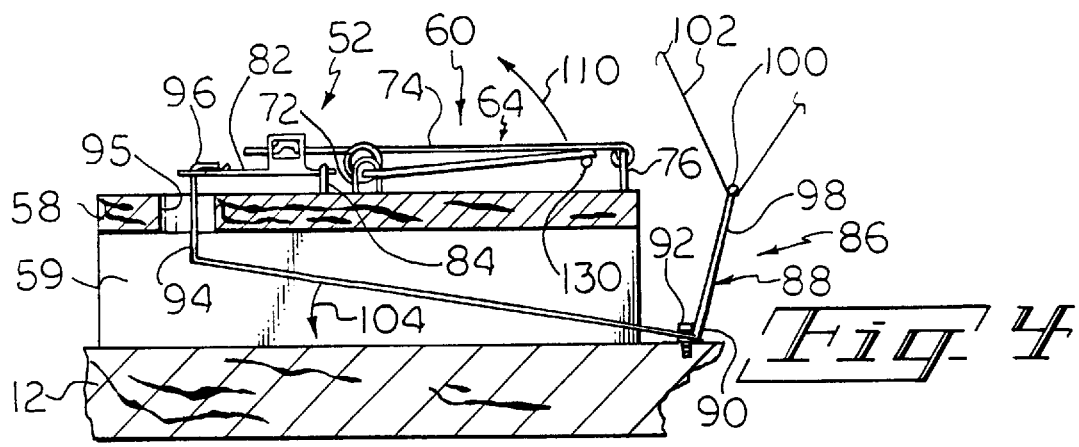
FIG. 4 is an enlarged fragmentary, sectional side view of the pole moving mechanism only, taken along the line 4—4 of FIG. 3.
Figure 5:
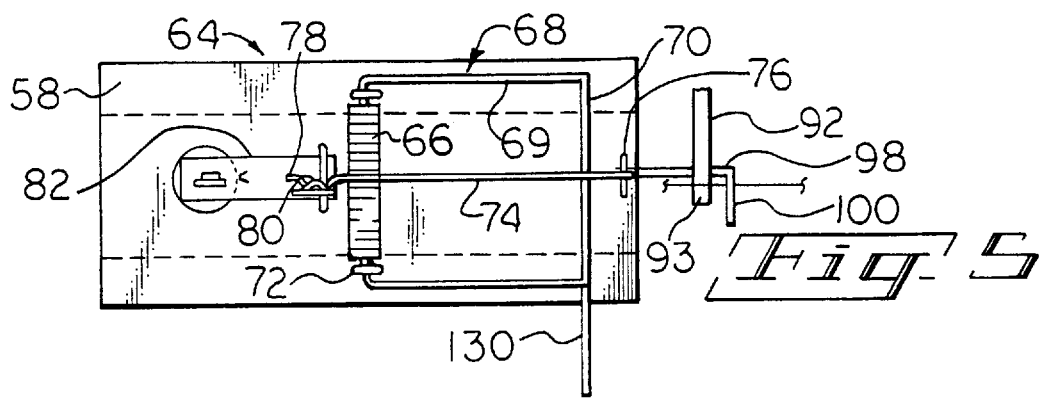
FIG. 5 is a top plan view of the pole moving mechanism illustrated in FIG. 4.
Figure 6:
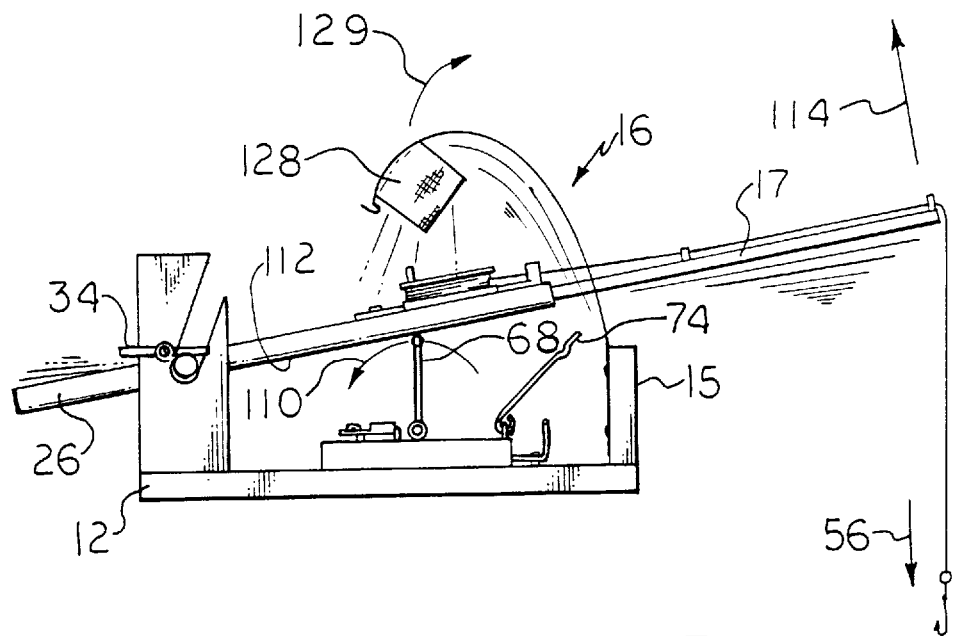
FIG. 6 is a side elevational view illustrating the pole moving mechanism and signaling flag in a position of transition between the set position illustrated in FIG. 2 and the signaling position illustrated in FIG. 1.

As illustrated in FIGS. 2 and 4, when a fish strikes the hook 24 to tug on the line 20 in the direction of the arrow 56, the trigger rod 88 will move upwardly against the yieldable end 93 of spring blade 92 and will swing counterclockwisely, in the direction of the arrow 104 in FIG. 4, to pull the holder 82 downwardly and release the keeper bar 74 for movement from the keeping position, illustrated in FIG. 4, to the released position illustrated in FIGS. 1 and 6 whereby the spring member 64 will violently upwardly swing in the direction of the arrow 110 to the position illustrated in FIG. 6 striking the underside 112 of the handle 26 thereby jerking the fishing rod staff 16 upwardly in the direction of the arrow 114. This movement, of course, rapidly upwardly moves the line 20 and hook 24 to impale the fish on the hook 24. The spring members continues its rotation to the rest position illustrated in FIG. 1.

The signaling device, generally designated 16, comprises an upstanding flexible staff, generally designated 120, having one end 122 fixed to the rest 15 and an upstanding terminal end 124 having a hook 126 for a purpose to become immediately apparent. The upper end 124 mounts a signaling flag 128.

Mounted on the pole moving bar 70 of the spring 64, is a horizontally extending trip rod 130 which, in the position of the parts illustrated in FIGS. 2–5, receives the hook 126 of flag signaling member 16. When the spring 64 is released from the set position, illustrated in FIGS. 2–5, and swings away from the elevated plate 58 in direction of the arrow 110, the rod 130 will escape the hook 126 whereby the flag 128 will swing in the opposite direction of rotation 129 (FIG. 6) to the position illustrated in FIG. 1 to signal that a strike has occurred.

THE OPERATION

The rod mounting axle or pivot member 28, having the handle 26 and rod staff 16 thereon, is disposed in the slots 30 of mounting brackets 32. The turn buttons 34 arc then moved from the release positions, illustrated in chain lines, to the pivot retaining positions illustrated in solid lines in FIG. 1 to overlie the rotating spindle 28 and preclude its inadvertent movement outwardly through the slots 30.

Live bait, or the like, (not shown) is skewered on the hook 24 and the reel 46 is operated to pay out sufficient line 20 to deposit the hook 24 into the water 25 containing game fish to be caught. The rod staff 17 rests on the forward rest 15 in the position illustrated in FIG. 1.

The spring 64 is set by swinging it from the relaxed position, illustrated in FIG. 1, to the set position, illustrated in FIGS. 2–5, against the biasing force of coiled section 66. The keeper 74 is swung to the keeping position illustrated in FIGS. 2–5 overlying the spring 64 and the offset end 78 of keeper 74 is releasably held by the retaining clip 80 of holder plate 82.

The portion 102 of the fishing line 20 is then downwardly displaced to a position received beneath the off set fish line receiving end 100 of trigger rod 88. The flag staff 120 is then folded from the signaling position, illustrated in FIG. 1, to the set position, illustrated in FIG. 2, so that the flag staff hook 126 is received and releasably held by the trip rod 130.

The fishermen can then leave the device unattended. The platform or base 42, will be disposed adjacent a hole H provided in the ice I on which the platform 13 rests. The hook 24 and fishing line 20 are thrown into the water 25 having a frozen layer of ice I thereon.

When a fish tugs on a bait coupled to the hook 24, the line 20 will move outwardly tending to pay line out from the reel 46, in the direction of the arrow 56. Tension force exerted on the line 20 will tend to cause the line portion 102, and the offset trigger rod end 100, to move upwardly and concurrently downwardly move the opposite trigger rod end 94, in the direction of arrow 104, whereby the keeper holder 80 releases the keeper end 78 which pivots out of the way about the mount 86. This releases the pole moving member 70 for rapid, upward swinging movement in the direction of the arrow 110 to the pole raising position to engage the underside 112 (FIG. 6) of the handle 26 whereby the fishing rod staff 20 is suddenly moved upwardly, in the direction of the arrow 114, to the position illustrated in FIG. 6 and in chain lines in FIG. 2, to bodily jerk the line 20 and hook 24 upwardly to set the hook and catch the fish. The parts are then returned to the positions illustrated in FIG. 1.

The signaling staff hook 126 is released by the upward movement of trip rod 130 to allow the flag 128 to swing in an opposite direction 129 (FIG. 6) to its signaling position, illustrated in FIG. 1.

ALTERNATE EMBODIMENT

Figure 7:
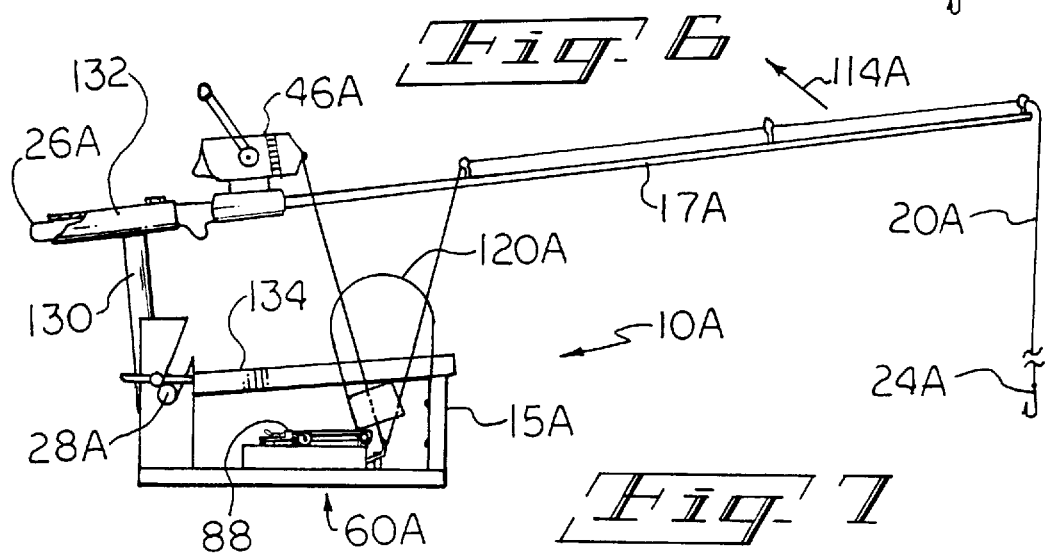
FIG. 7 is a side elevational view of a slightly modified embodiment.
Figure 8:
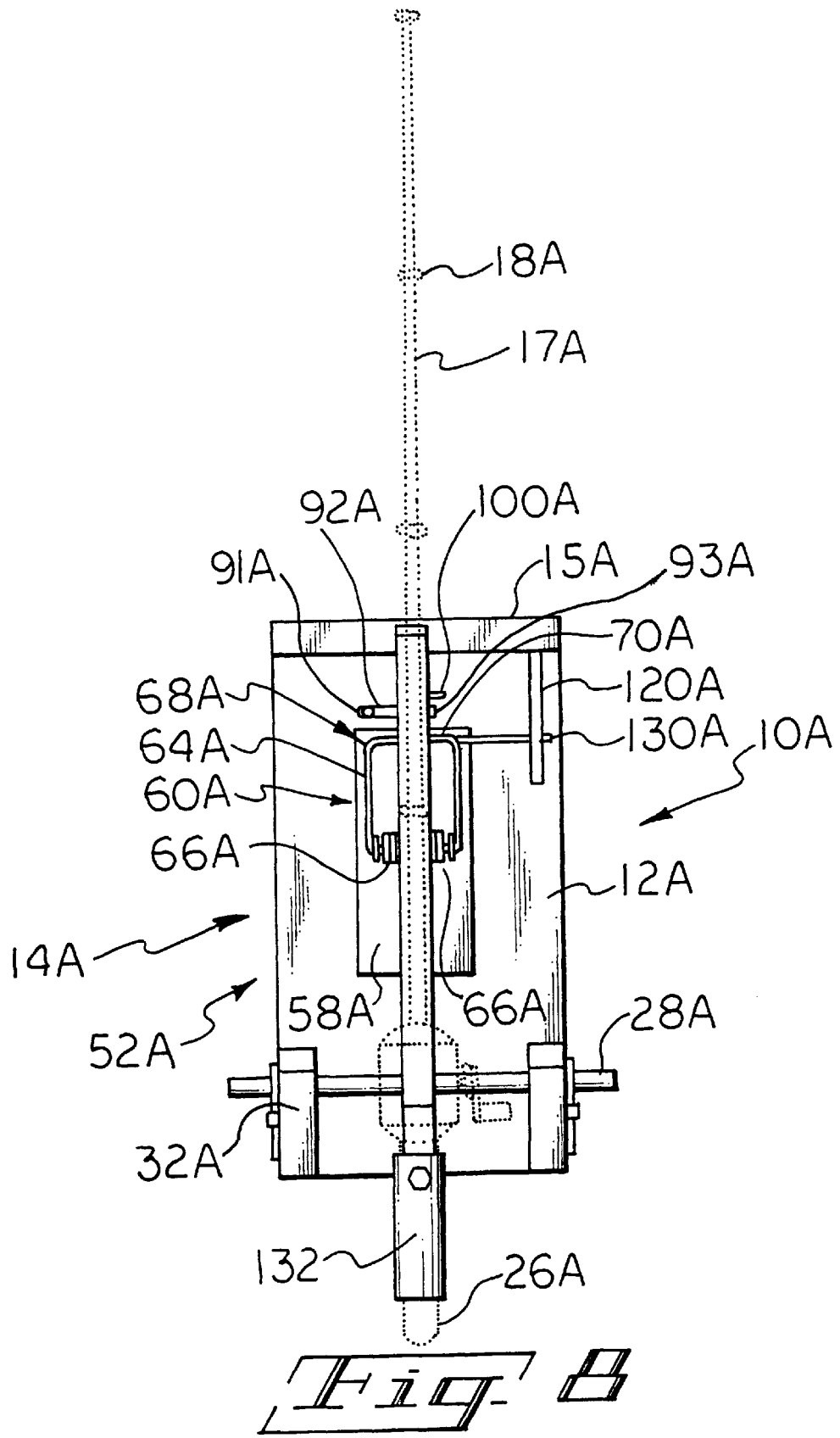
FIG. 8 is an enlarged top plan view of the embodiment apparatus illustrated in FIG. 7, the fishing pole being illustrated in phantom lines.

An alternate embodiment, generally designated 10A, is illustrated in FIGS. 7 and 8 and is similar in many respects to the embodiment illustrated in FIGS. 1–6. Generally similar parts will be identified by generally similar reference characters followed by the letter A subscript.

The fishing apparatus 10A differs in that the pole holding member includes an upstanding post 130 fixed to rotatable shaft 28A and mounting, at its upper end, a hollow cylindrical sleeve 132 which receives a fishing rod handle 26A mounting the fishing rod staff 16A. The reel 46A illustrated is a different construction but conventional, nonetheless.

A horizontally disposed rod actuating bar 134 is fixed to the rotatable shaft 40A and is disposed generally parallel to the fishing rod staff 17A and is supported by the forward rest 15A.

When the rod moving spring 60A swings upwardly from the set position illustrated in FIG. 7, it will engage the underside of the rod activating bar 134 suddenly and rapidly forcing it, and the pole mounting sleeve 132, to rotate counter clockwise, in the direction of the arrow 114A. This movement causes the fishing pole staff 17A, line 20A and hook 24A, to rapidly upwardly move to set the hook 24A.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Fishing apparatus comprising:

a base;

pole mount means on said base for pivotally mounting a fishing pole, having a fishing line supported thereon, for pivotal movement about an axis; and pole pivoting means on said base, responsive to tension force being applied to said fishing line, for pivoting said fishing pole about said axis;

said pole pivoting means comprising pole moving means swingably, mounted on said base for movement between a remote position, removed from said pole mount means, and a pole mount moving position engaging said pole mount means;

said pole mount means for pivotally mounting said fishing pole comprising a forward end portion for receiving a forward line supporting portion of said fishing pole forward of said axis and a rearward end portion rearward of said axis and a transverse pivot member intermediate said forward and rearward end portions rotatable about said axis;

said means for pivotally mounting said fishing pole comprising a hollow fishing rod handle receiving receptacle;

said means for pivotally mounting said fishing pole comprising a generally horizontally disposed bar fixed to said transverse pivot member for pivotal movement therewith;

said receptacle being mounted on said bar;

said pole pivoting means comprising a pole moving member swingably mounted on said base for movement between a position, removed from said bar and adjacent said base, and a vertically raised position, engaging said bar, to upwardly move said bar and said pole mounted thereon.

* * * * *